United States Patent
Bakke et al.

(10) Patent No.: US 7,484,114 B2
(45) Date of Patent: Jan. 27, 2009

(54) METHOD AND APPARATUS FOR PROVIDING REDUNDANT ACCESS TO A SHARED RESOURCE WITH A SHAREABLE SPARE ADAPTER

(75) Inventors: Brian Eric Bakke, Rochester, MN (US); Timothy Jerry Schimke, Oronoco, MN (US); Joseph Thomas Writz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 696 days.

(21) Appl. No.: 09/932,140

(22) Filed: Aug. 17, 2001

(65) Prior Publication Data

US 2003/0037275 A1 Feb. 20, 2003

(51) Int. Cl.
*G06F 11/00* (2006.01)

(52) U.S. Cl. .................. 714/4; 714/7; 714/13; 714/42; 714/43; 714/56

(58) Field of Classification Search .............. 714/4, 714/7, 13, 42, 43, 56, 9, 11, 12; 709/213, 709/214; 370/450, 451, 909
See application file for complete search history.

(56) References Cited

U.S. PATENT DOCUMENTS

| | | | | |
|---|---|---|---|---|
| 5,321,394 | A * | 6/1994 | Carlton et al. | 340/825.01 |
| 5,964,887 | A * | 10/1999 | Conseil | 714/13 |
| 5,987,621 | A * | 11/1999 | Duso et al. | 714/4 |
| 6,314,525 | B1 * | 11/2001 | Mahalingham et al. | 714/4 |
| 6,408,343 | B1 * | 6/2002 | Erickson et al. | 714/11 |
| 6,449,249 | B1 * | 9/2002 | Cloonan et al. | 714/4 |
| 6,718,383 | B1 * | 4/2004 | Hebert | 714/4 |

* cited by examiner

*Primary Examiner*—Robert Beausoliel
*Assistant Examiner*—Joseph D Manoskey
(74) *Attorney, Agent, or Firm*—Wood, Herron & Evans LLP; Scott A. Stinebruner

(57) ABSTRACT

An apparatus, method and program product provide access for a host device to a shared resource via a spare adapter configured to replace any of a plurality of access adapters.

29 Claims, 4 Drawing Sheets

METHOD AND APPARATUS FOR PROVIDING REDUNDANT ACCESS TO A SHARED RESOURCE WITH A SHAREABLE SPARE ADAPTER

FIELD OF THE INVENTION

The present invention relates to the access of shared resources within a computer networked environment.

BACKGROUND OF THE INVENTION

With the advent of highspeed interconnections, computer resource management has become ubiquitous for networked systems. For instance, systems are needed to support increasing storage requirements to meet growing application and enterprise needs. Systems that previously relied on stand-alone or dedicated external storage devices, have migrated towards expanded resources available through networked storage. Further, networks and associated interface technologies have evolved from simple hub and spoke applications to complex and robust switched networks with multiple subnets, zones, segments, WANs and the Internet.

The complexity and volume of such networks has prompted some system designers to physically or logically consolidate storage resources, as well as adapters and/or servers. Such structure may promote substantial performance gains. An example of one such an architecture includes Storage Area Networks (SANs). SANs are centrally managed, highspeed storage networks consisting of multiple storage systems, storage management software, application software, application servers and network hardware. SANs expedite information access, storage and protection to campus, industry and metro environments. SANs may be based upon storage protocols and interconnects that enable "any-to-any" connectivity between servers and storage. Adapters of SAN networks support interconnects to multiple operating systems and environments.

One principal feature of an adapter, or a comparable computer interface, is enabling communications between a processor or server complex with one or more peripheral resources. Namely, adapters account for diverse characteristics, applications and hardware designs of such resources to simplify interconnections. For instance, an adapter may manipulate or translate the content or protocol of signals emitted from a server in such a manner that a peripheral device may readily process them. As such, adapters and associated software-executing mechanisms can provide a highly configurable and flexible interface for peripheral resources. As a result, device-specific operations can be "wrapped" to provide a common software interface that effectively permits data exchange without any special regard for the specific intricacies of the underlying hardware. As such, adapters typically incorporate a physical connector required to connect the peripheral resource to a host or server system.

In this manner, the proper operation of adapters is critical to the access of networked servers, as well as to overall system operations. Despite their relative importance to SAN operations, adapters remain vulnerable to failure. Causes of adapter failure include hardware and software complications, as well as general aging considerations. An adapter may also go offline in response to losing a connection or pathway through the interface. In many systems, regaining connectivity between a server and storage may require physically removing and replacing a failed adapter.

Replacing an adapter may require that at least a portion of the system be shut down and rebooted. In multi-user computer environments, where system availability is critical, an inability to access a resource for any amount of time may have a significant impact on the productivity of a relatively large number of users and operations. In many mission-critical applications, any such downtime is intolerable.

Consequently, some system designers attempt to introduce redundancy into networks in the form of dedicated, replacement adapters. More specifically, some network architectures may specifically allocate a backup adapter for each primary adapter. As such, a system with four primary access adapters will merit four dedicated, replacement adapters. Ideally, each backup adapter may intervene to enable a host access to a resource in the event of its primary's failure. For example, the responsibilities of the failed adapter may be passed to the designated replacement adapter.

Such conventional replacement procedures, however, burden host servers with substantial processing requirements. Host responsibilities may involve coordinating the replacement of adapters. A host system must conventionally initiate and direct all corrective and reconnecting processes. Each host must know and evaluate all pathways to a resource, and must further monitor and navigate adapters and resources, alike. Such requirements detract from other host processes and retard system performance. Furthermore, some servers do not support programming sufficient to execute such procedures. The duplicate adapters further represent additional equipment costs and often complicate network designs.

Therefore, a significant need exists in the art for a manner of providing robust access to a resource with minimal negative impact on system processes and design.

SUMMARY OF THE INVENTION

The present invention provides an apparatus, method and program configured to improve the reliability of access to a shared resource. The invention enables access to the shared resource by controlling a shareable spare adapter. The spare adapter may be configured to replace any of a plurality of access adapters providing access the shared resource. As such, program code of one embodiment may initiate a substitution of the shareable spare adapter as necessary for any of the plurality of the access adapters. The embodiment accomplishes the substitution by reassigning correlation tokens from an access adapter to the shareable spare adapter. Prior to reassigning correlation tokens, the embodiment may disable both the access and shareable spare adapters.

Program code consistent with the invention may execute the substitution upon the detection of an event. One such event may embody a change in a heartbeat signal emanating from an access adapter. As such, the embodiment may continually monitor the network for the event, and additionally initiate notification procedures in response to signal silence. In this manner, program code may initiate the replacement or servicing of an access adapter. A host network may then evaluate newly assigned tokens of the shareable spare adapter to reconnect with the shared resource.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

One embodiment of the present invention provides access to a shared resource for a host or server network. The embodiment uses a shareable spare adapter to ensure redundant access to the resource. Program code manipulates the spare, which is configured to replace any of a plurality of access adapters, in response to a predefined event. For instance, the embodiment may employ a shareable spare adapter to reestablish connection between the host and resource. Such a connection may become broken when an access adapter fails. Significantly, the system may accomplish such redundancy and without burdening the host network or requiring substantial, additional hardware. The Storage Area Network of FIG. 1 illustrates one environment suitable for implementation of the present embodiment.

Figure 1:
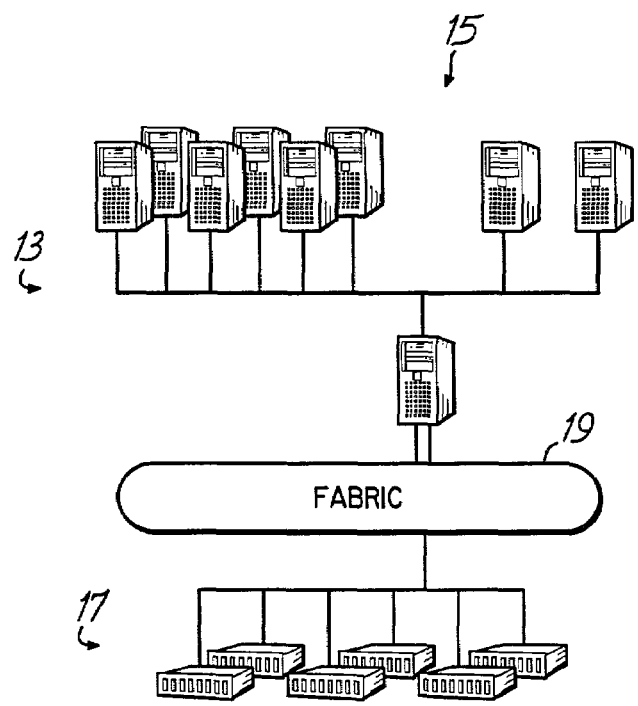
FIG. 1 shows a networked computer environment incorporating a storage access network consistent with the invention.

As illustrated in FIG. 1, SANs may generally describe a network 13 of hubs, switches, adapters and routers used for accessing shared storage resource 17. A SAN consolidates and isolates all storage on a separate section of a network. Such partitioning ensures that other network traffic is not impacted by storage traffic. FIG. 1 depicts host servers 15 accessing shared storage 17 via a conventional network interface 19. As discussed herein, an exemplary network interface or interconnect fabric 19 regards the combination of connections between nodes of the network 13, and may incorporate, for instance, Fibre Channel technology. Fibre Channel is an open, industry standard, high speed serial interface for connecting computers and storage resources across large distances. Exemplary resources include RAID arrays, as well as disk and tape drives. Fibre Channel further supports flexible wiring topologies and several upper level protocols.

A SAN can provide connectivity from any server to any tape or RAID subsystem in a network. This connectivity enables a designer to pool storage devices in one location, perhaps using a common automated tape library (not shown). Such a library can act as a backup device for the servers. The SAN can also consolidate management resources, and offload data traffic from a front end LAN. Other benefits include high bandwidth, increased range, expanded address space and ease of integration with other systems. In typical SAN configurations, host servers 15 may "walk" across the interconnect fabric 19 until each accesses the resource 17 via a port of an access adapter.

Figure 2:
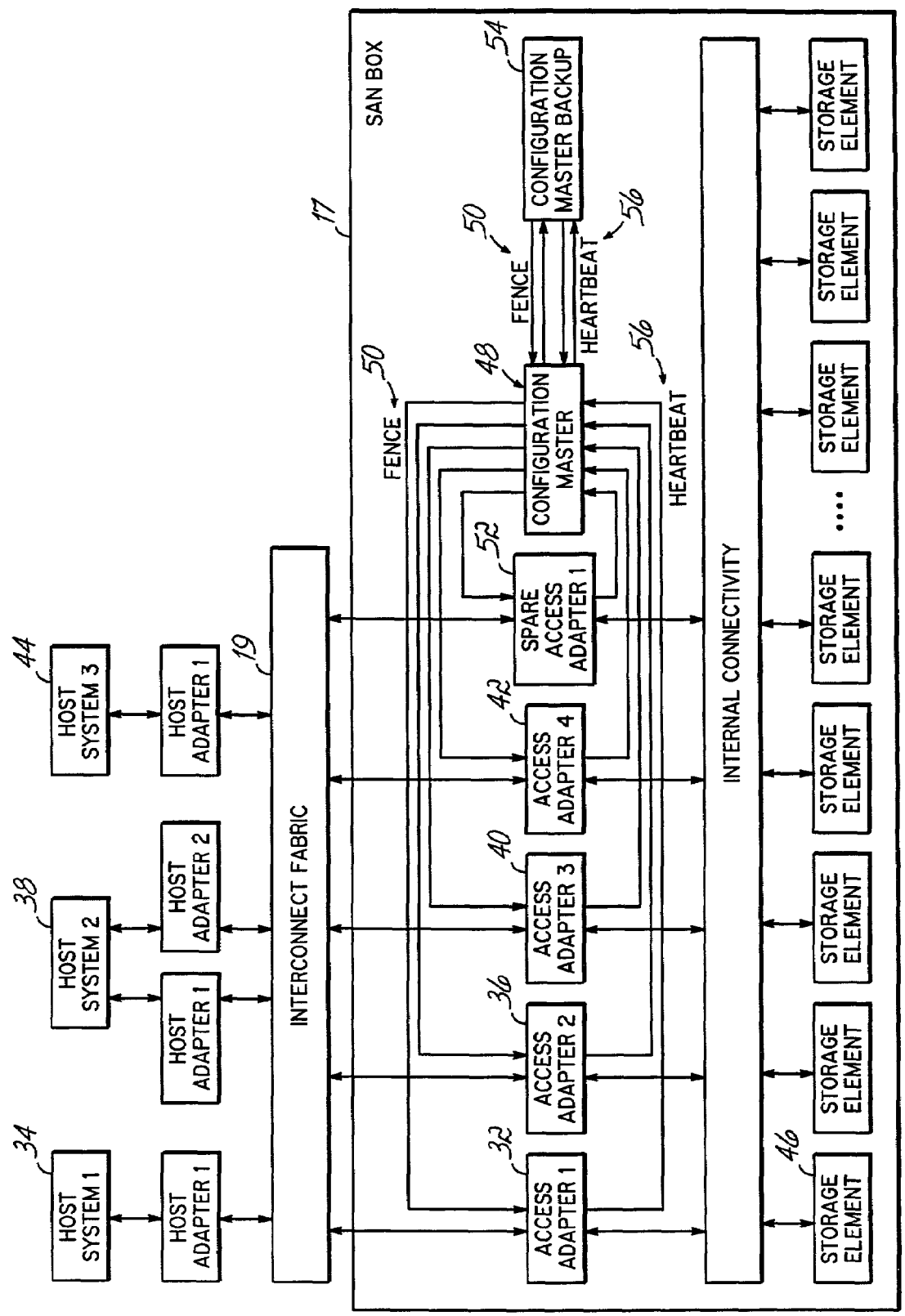
FIG. 2 is a block diagram illustrating the data flow between software components FIG. 1.

FIG. 2 illustrates components and related processing applications, which are consistent with the principles of the present invention, and further, are suited for execution within the exemplary SAN environment of FIG. 1. Generally, the shared resource or SAN Box 17 may utilize a single, shareable spare adapter 52 to replace any access adapter within the SAN Box 17. The SAN Box 17 may activate the shareable spare 52 as necessary to maintain communications between a host server and shared storage. More particularly, the exemplary SAN Box 17 may utilize a switched or networked interconnect fabric 19 operable to transfer communications between a host network, such as that illustrated in FIG. 1, and at least one adapter configured to access the shared storage.

Exemplary interconnect fabric applications may include any suitable topology, such as Fibre Channel, Infiniband, parallel SCSI, and Ethernet. Of note, a fabric for a small network may embody a simple cable or switching network configured to allow the host network access a storage resource, or box, via an adapter. A host system may represent users or server systems of the shared resource. Exemplary server systems may include the AS/400 computer system, as well as RS-6000 systems or other generic servers.

The embodiment may physically or logically associate each host with a host adapter. Each host adapter may attach to host I/O buses or interfaces. In addition to providing a physical interface between the host bus and the interconnect fabric, host adapters may support various Upper Level Protocols (ULPs) like SCSI, TCP/IP, VI and ESCON. Most adapters come with drivers that interface with standard host drivers for such ULPs.

As discussed above, a host system 34 of FIG. 2 may access a shared resource 17, data or function via adapters. As shown, the shared resource 17 may comprise a large storage box. The system may allocate disk storage from the shared SAN box 17 to each host. The embodiment may map or address disk storage within the system as LUNs, or logical units. Each LUN consists of a portion or portions of one or more storage elements 46. As is known, SANs conventionally implement zoning or volume mapping to isolate storage to specific host systems to ensure data integrity. Volume mapping enables a shared storage device, such as a LUN on a RAID array, to be mapped to a specific host system. Volume mapping ensures that only the authorized or mapped host can access the LUN in a shared storage environment.

As such, the system may configure each access adapter 32, 36, 40, 42 to manage a subset of the LUNs. Access adapters 32, 36, 40, 42 may further implement protocol needed to interface storage elements 46 of the box/shared resource 17. As such, the access adapters 32, 36, 40, 42 may map between an internal infrastructure of the storage box and the external interconnect fabric 19. In this manner, access adapters 32, 36, 40, 42 allow the host system to access the appropriate LUNs of the shared resource 17.

As illustrated in FIG. 2, a first adapter 32 may manage all LUNs for a first host system 34. A second adapter 36 may manage only a portion of the LUNs allocated to a second host system 38. A third adapter 40 may manage the remaining LUNs assigned to the second host system 38. Finally, a fourth adapter 42 may control the LUNs for a third host system 44. In this manner, the adapters 32, 36, 40, 42 distribute resources contained within the box to respective host systems 34, 38, 44.

One key to effectively accessing the shared resource 17 may regard correlation tokens. A configuration master 48 may impute such tokens onto each adapter 32, 36, 40, 42 to allow a host and an access adapter to pair up across the interconnect fabric 19. A correlation token may comprise any data or designator suitable to identify an adapter. Exemplary tokens may include an adapter serial number, or an IEEE-assigned World Wide Unique ID. Other token assignment schemes may call for more arbitrary data designators, such as a randomly generated, numeric identifier.

The correlation token may further be associated with information that instructs the host system and/or the access adapter as to which LUNs of the shared resource 17 should be accessed. In this manner, the correlation token acts as a label, or pointer, that facilitates the access of assigned resources to the requesting host system 34. As discussed below in detail, a host system 34 may "walk" or search the interconnect fabric 19 looking for a specific correlation token. For instance, the host 34 may sequentially evaluate the correlation tokens of each adapter 32, 36, 40, 42 encountered on the fabric 19.

The host system 34 may compare its own correlation tokens with each sampled token until a match is found. Matching tokens may enable the host system 34 to access a storage element 46 via a port of the access adapter 32. For purposes of the embodiment, it is important to note that correlation tokens may be assigned and reassigned to different adapters. In this manner, the host 34 may access a storage element 46 via any adapter carrying matching correlation tokens. As discussed below, this characteristic allows the configuration master 48 to orchestrate the replacement of a failed access adapter with a spare one without disruptive reprogramming or other interruption.

Correlation tokens may initially be assigned by an application-specific, out-of-band communication. For instance, a SAN designer may assign tokens to associate particular resources with specific host systems. The designer may designate such assignments when initially configuring a host and configuration master 48 component of SAN Box 17. The "virtual" nature of correlation tokens allows the tokens to be disassociated with the physical adapter to which they had been originally assigned. This characteristic allows the configuration master 48 component of SAN Box 17 to remove correlation tokens from a failed adapter, and immediately reassign them to the spare adapter in such a manner as the host may be unaffected by the switch. In this manner, subsequent assignments may be executed according to system and maintenance requirements. Significantly, the embodiment allows for transient fail-over procedures without burdening a host server system.

The configuration master 48 may execute the above discussed correlation token assignments with regard to each adapter 32, 36, 40, 42. A suitable configuration master 48 may include a processor and firmware, and may comprise a computing machine in a preferred embodiment. The configuration master 48 primarily assigns resources to the access adapters 32, 36, 40, 42. As discussed above, the configuration master 48 may use correlation tokens to designate such assignments. For instance, the configuration master 48 may reassign tokens of a failed adapter to another, fully-functioning one.

To this end, the configuration master 48 may also monitor the status of the access adapters 32, 36, 40, 42. More particularly, the configuration master 48 may register the periodic transmission of heartbeat signals 56. Such signals 56 may be emitted by an access adapter, a spare access adapter, a configuration master component, and a configuration master backup component. Heartbeat signals may comprise a simple message identifying the component source of the transmission. For instance, the heartbeat signal 56 may convey the serial number or other header information pertaining to an adapter. The reception of the signal 56 may represent to the configuration master 48 that the transmitting adapter, or other component, is functioning properly. Conversely, a detected absence of the heartbeat signal 56 may communicate the failure of the corresponding component to the configuration master 48. Of note, one embodiment may call for an adapter to cease transmission of its own heartbeat signal 56 for routine and/or maintenance reasons.

In response to detecting the loss of a heartbeat signal 56, the configuration master 48 may employ fence logic 50 programming to disable the associated adapter. Fence logic 50 enables the configuration master 48 to take a failed adapter offline while replacement arrangements are made. Fence logic 50 may disable a designated component by initiating the removal of power to the adapter, or by resetting the registers of an adapter. Of note, fence logic 50 additionally prevents a malfunctioning adapter from communicating with, and further corrupting, a system application. Fence logic 50 may thus hold a failed adapter in a disabled state until the configuration master 48 has reconfigured a shareable spare access adapter 52 to take the place of the failed one 36. For instance, the configuration master may remove applicable correlation tokens from the failed adapter 36 and reassign them to the shareable spare adapter 52.

The configuration master 48 may hold one or more such shareable spare adapters in stasis in anticipation of component failure or required maintenance. The hardware and software of the substituted shareable spare access adapter 52 may be identical to that of the replaced access adapter 36. As such, only the roles and the correlation tokens assigned to active and spare adapters may differ. Alternatively, for cost or other design considerations, the embodiment may employ shareable spare adapters having more limited functionality and lower unit costs. Such "interim" spares may nonetheless allow access to the shared resource until they can be replaced by more capable and permanent adapters.

The configuration master 48 may employ fence logic to hold a shareable spare adapter 52 in stasis while it reconfigures it. For instance, the configuration master 48 may reassign correlation tokens, removed from the failed adapter 36, to the spare adapter 52. In this manner, the shareable spare adapter 52 may functionally assume the original tokens and virtual identity of the failed adapter 36. More particularly, the correlation tokens assigned to the spare 52 may now control access to all resources previously held by the failed access adapter 36. As discussed herein, the assignment of the tokens may enable the host to locate and access the port of the shareable spare adapter 52.

After reconfiguring the shareable spare adapter 52, the configuration master 48 may remove the fence logic 50 enabling the shareable spare adapter 52. Released and reconfigured, the spare adapter 52 may now allow access to the shared storage element 46. An appropriate host 38 may arrive at the spare 52 after "walking" the interconnect fabric 19 for designated, reassigned correlation tokens. Upon recognition that a connection with the shared resource 17 has been broken, the host 38 may reestablish the connection by sequentially evaluating the correlation tokens of access adapters 32, 52, 40, 42 encountered on the interconnect fabric 19. More particularly, the host 38 may exchange correlation tokens with access adapters encountered throughout the switches and network topology of the interconnect fabric 19 until a match is encountered. In this manner, the host system 38 may interface with the shareable spare adapter 52 and, thus, regain access to the shared resource 17 via a port of the spare adapter 52.

As discussed above, walking the fabric 19 may allow the embodiment to transparently switch operations to the shareable spare adapter 52. Of note, a host walking the fabric may operate without regard to which physical adapter holds matching correlation tokens. Instead, the host may conventionally evaluate tokens of adapters as it sequentially encounters them. The host 38 need only concern itself with associated physical protocol and the correlation token. As such, the host system 38 will not access the shared resource 17 via the failed adapter 36, as the host correlation tokens will no longer match. Of note, the system may execute the illustrative fail-over operation without interrupting the operation of other host systems 34, 44.

Coincident with the implementation of the spare adapter 52, the system may initiate the repair or replacement of the failed adapter 36. For instance, program code may initiate reporting procedures to update an error log, illuminate a LED, or other application-specific notification mechanism. In response, a repair technician may replace or otherwise service the failed adapter. The configuration master 48 may release the fence logic 50 holding the previously-failed adapter 36 offline. As discussed above, the configuration master 48 may now regard the reconfigured, failed adapter 36 as a shareable spare adapter. As such, the configuration master 48 may posture the reconfigured adapter 36 to replace any future access adapter 32, 40, 42, 52 that requires service.

A configuration master backup 54 may provide further assurance against silent system failure by embodying an additional level of redundancy. Namely, the primary role of the configuration master backup 54 may comprise monitoring the proper operation of the primary configuration master 48. As such, the configuration master 48 may emit a heartbeat signal 56 in a manner analogous to the access adapters. As above, the configuration master backup 54 may detect an absence of a heartbeat signal 56. The backup 54 may translate the silence as being indicative of a configuration master 48 malfunction.

Although a failure of the configuration master 48 may not immediately impact the operation of the network 10, its absence nonetheless can precipitate a loss of connectivity between the host network and the shared resource. Should a failed configuration master be unable to execute a fail-over operation, then a next occurring failure of an access adapter may be left unaddressed. That is, there may be no mechanism in place to coordinate necessary replacement processes.

To avoid such a scenario, as well as all associated disconnects, the configuration master backup 54 may employ fence logic 50 to disable the failed configuration master 48. The fence logic 50 prepares the configuration master 48 for corrective procedures, including component replacement. The configuration master backup 54 may further initiate notification procedures to apprize operators of the potentially disruptive situation. Once the configuration master backup 54 removes the fence logic 50 and the configuration master 48 is back online, the backup 54 may resume monitoring a heartbeat signal 56.

Of note, alternative embodiments may include a spare configuration master. As such, program code could manipulate additional fences, configuration masters and heartbeats in an analogous manner as that described in the above adapter fail-over sequences. Furthermore, it should be understood by one skilled in the art that an embodiment may employ multiple shareable spare adapters. As such, a system having "m" spares can tolerate the simultaneous event of up to "m" failures of any combination of access and spare access adapters.

Furthermore, the embodiment is compatible with known, redundant-access techniques. For instance, SAN architects may conventionally assign multiple adapter ports to a common set of LUNs. As such, the host system may independently access the LUNS through either of two ports. This redundancy may allow a system to tolerate a failure of one of the assigned adapters, while still enabling access to the storage box. One embodiment of the present invention can provide yet another level of redundancy by availing a spare adapter configured to replace either dedicated adapter. In this manner, the embodiment accommodates and augments conventional SAN architectures.

Figure 3:
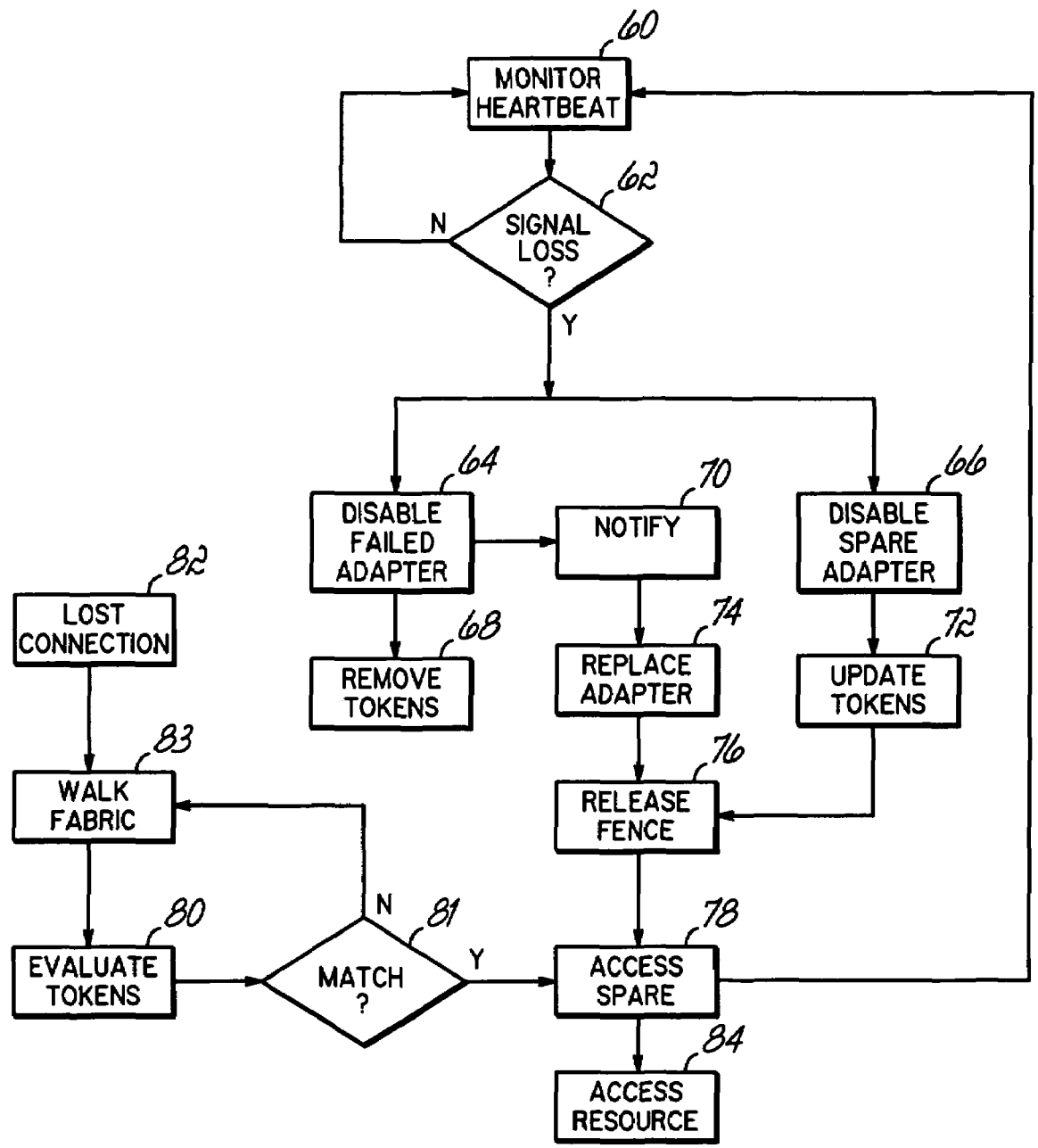
FIG. 3 is flowchart illustrating process steps suitable for execution within the environment of FIG. 2.

FIG. 3 illustrates processes steps that are suitable for execution within the networked environment of FIG. 2. At block 60 of FIG. 3, the configuration master monitors the operation of the access adapters of the system. More particularly, the configuration master may receive heartbeat signals from the access adapters at application-specific intervals. As discussed above, the heartbeat signal may embody a succinct message from the adapter to a configuration master, conveying some identification data, such as an address or serial number. Reception of the heartbeat signal may announce the proper operation of the transmitting adapter to the configuration master.

The configuration master may detect the absence of the heartbeat signal at block 62. A failure of the access adapter to transmit a heartbeat signal may mean that the adapter has experienced some malfunction or failure. For instance, a software or hardware glitch may have caused the adapter to lose contact with the interconnect fabric. The adapter may alternatively cease transmission of the signal of its own accord for routine maintenance or upgrade purposes.

In response, the configuration master may disable both the failed adapter and a shareable spare adapter at blocks 64 and 66. The configuration master may utilize fence logic to hold the adapters in stasis while functionally disconnecting them from the rest of the system. For instance, the fence logic may take the failed adapter offline at block 64. As such, the configuration master prevents the failed adapter from communicating through the interconnect fabric. This action recognizes that the failed adapter could otherwise continue to introduce problems into the network, even in the absence of the heartbeat signal.

The fence logic may remove power to the adapter or hold the failed adapter in a disabled/reset state, while the configuration master removes configuration tokens from the failed adapter. As such, the failed adapter may control no resources. The embodiment may remove all tokens assigned to the adapter to prevent the adapter from propagating error throughout other system accessing the fabric.

Coincident with the failure of the heartbeat signal at block 62, the configuration master may use fence logic to disable a spare adapter at block 66. The configuration master may hold one or more such spare adapters in stasis awaiting a system failure. The hardware and software of the shareable spare adapter may be identical to that of an access adapter. As such, only the correlation tokens assigned to active and spare adapters may differ. Alternatively, for cost considerations, the embodiment may employ shareable spare adapters having more limited functionality and lower unit costs. Such temporary spares may nonetheless allow access to the shared resource until replaced.

While fence logic programming holds the shareable spare adapter in stasis, program code may reconfigure the spare at block 72. For instance, the configuration master may update the correlation token(s) assigned to the shareable spare adapter. Particularly, the configuration master may reassign correlation tokens removed from the failed adapter at block 68 to the shareable spare adapter. Thus, the spare adapter assumes the original tokens and virtual identity of the failed adapter. As discussed below, this assignment may ultimately enable the host to locate the port of the spare adapter at block 78.

After reconfiguring the spare adapter at block 72, the configuration master may release at block 76 the fence logic acting upon the shareable spare adapter. Released and reconfigured, the spare adapter assumes the role of the failed adapter. As such, the host may access the shared storage via the reconfigured spare at block 78.

As illustrated in FIG. 3, the host may arrive at the spare after "walking" the interconnect fabric for the appropriate correlation tokens at block 83. Of note, the host may initiate a walking procedure coincident with recognizing that a connection with the shared resource has been broken at block 82. More particularly, the host may attempt to reestablish the connection with the resource by sequentially evaluating the correlation tokens of access adapters encountered on the interconnect fabric at block 80. That is, the host may navigate through switches and network topology of the interconnect fabric, communicating and exchanging tokens with each adapter until a match is encountered at block 81. In this manner, the host system may connect to the shareable spare adapter at block 78 and, subsequently, regain access to the shared resources via a port of the shareable spare adapter at block 84.

Of note, walking the fabric at block 83 of FIG. 3 may allow the embodiment to transparently switch operations to the shareable spare adapter. The host may be unaware of which physical adapter holds the applicable correlation tokens, it being concerned only with associated physical protocol. Because the configuration master removed the correlation tokens of the failed adapter at block 68, the host will not access the shared resource via the failed adapter, as the configuration master has removed the tokens. Significantly, the process steps illustrated in FIG. 3 enable the fail-over operation to occur without interrupting the operation of other host systems.

Returning to block 70 of FIG. 3, the SAN Box may utilize conventional error notification mechanisms to initiate the repair or replacement of the failed adapter. For instance, program code may initiate reporting procedures to update an error log, illuminate a LED, initiate an email, or other application-specific dispatch mechanism such as a phone or buzzer. At block 74, a repair technician may replace or otherwise service the failed adapter, then bring the previously-failed adapter back online.

More specifically, the configuration master may release the fence logic disabling the adapter at block 76 after appropriate reconfiguration procedures are completed. The system may now regard the reconfigured, failed adapter as a shareable spare adapter. As such, the configuration master may utilize the failed adapter to replace any other failed access adapter. Of note, there may be no advantage to switching back the roles of the spare and accessed adapters, though such a scenario is possible within the confines of the embodiment.

Figure 4:
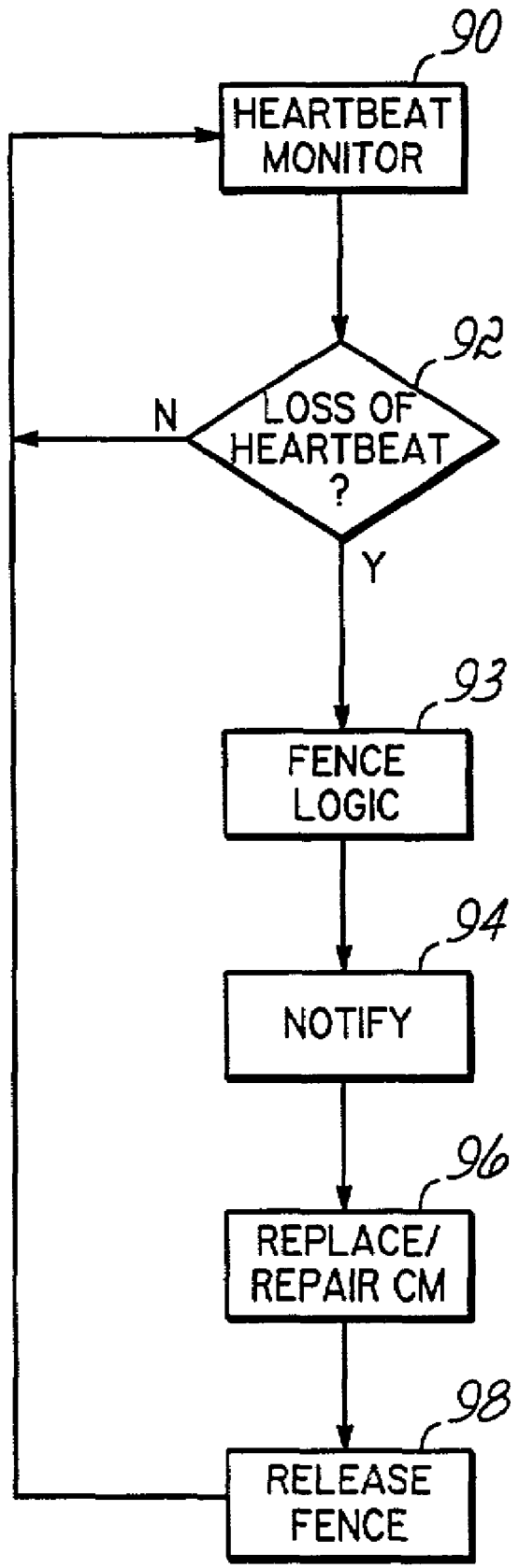
FIG. 4 is a flowchart that shows a software routine executed by the configuration master component in the block diagram of FIG. 2.

The flowchart of FIG. 4 illustrates a sequence of steps that the configuration master backup 54 of FIG. 2 may execute in response to a failure of the primary configuration master. As discussed above, the primary role of the configuration master backup may comprise monitoring the operation of the configuration master. For instance, the configuration master backup watches for a failure of the configuration master at block 90 of FIG. 4. More particularly, the configuration master backup may detect an absence of a heartbeat signal at block 92. The configuration master may emanate such a heartbeat signal at regular intervals during normal operation. Detected silence of the signal at block 92 may communicate a failure of the configuration master to the configuration master backup.

Should the configuration master fail, the system may be at risk of losing connectivity between the host network and the shared resource. Such loss of access could occur where an access adapter fails and the configuration master is not available to coordinate a replacement, or fail-over, operation. Consequently, the configuration master backup may employ fence logic to disable the configuration master at block 93. Removing the configuration master offline may prevent a malfunctioning configuration master from corrupting a SAN environment.

The fence logic may further ready the configuration master for corrective procedures. To this end, the configuration master backup may initiate notification procedures at block 94. Suitable procedures may apprize operators of the potentially disruptive situations. In response, an operator may repair or replace the configuration master at block 96, and the configuration master backup may release the fence at block 98 and resume monitoring a heartbeat signal at bock 90.

Figure 5:
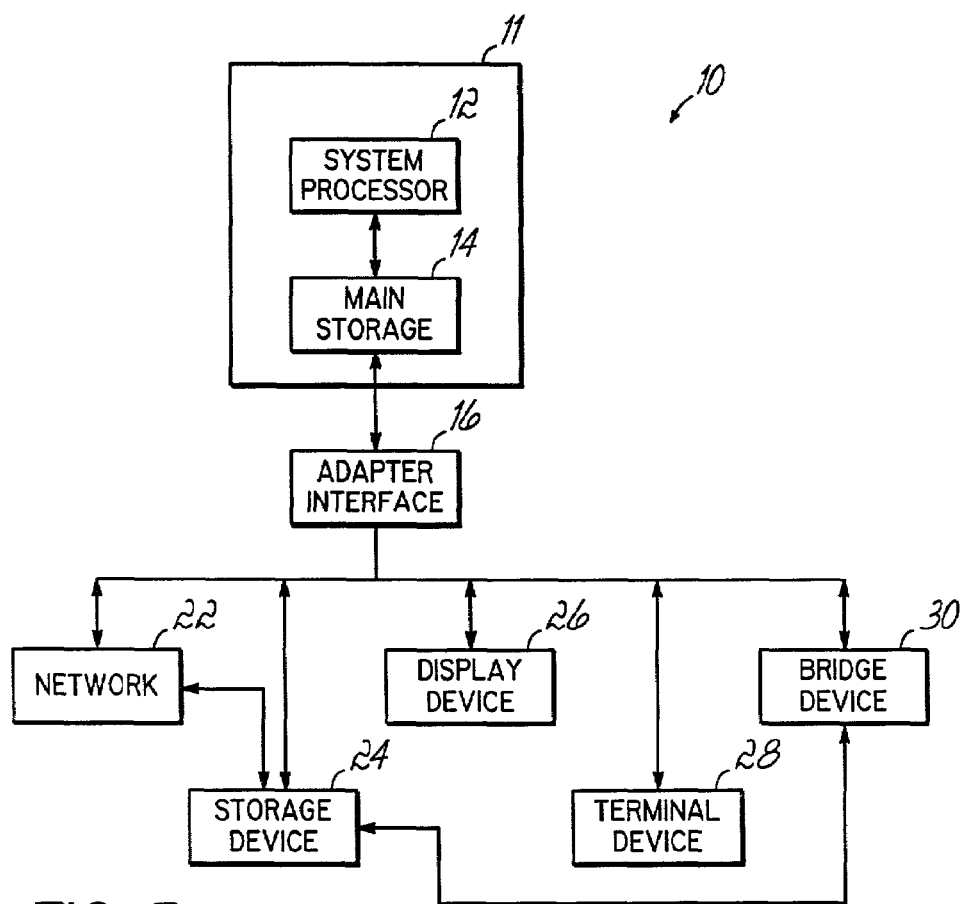
FIG. 5 is a block diagram of a computer system consistent with the invention.

While the SAN network of FIG. 2 represents a preferred embodiment of the invention, the apparatus 10 of FIG. 5 depicts a more nonspecific, system-generic application that is, nonetheless, consistent with the principles of the present invention. Apparatus 10 will hereinafter also be referred to as a "computer system," or "network," although it should be appreciated the term "apparatus" may also include other suitable programmable electronic devices consistent with the invention. For the purposes of the invention, apparatus 10 may represent practically any type of computer or networked system that relies on an adapter interface 16.

Host system 11 may embody a server 15 in the above described FIG. 1, and may include a system processor 12 coupled to a main storage 14. In the illustrated embodiment, host system 11 may include a RS/6000 or AS/400 midrange computer available from International Business Machines Corporation. However, it should be appreciated that any number of alternate environments may utilize the concepts disclosed herein, and thus, the invention should not be limited to use with any particular computing environment.

Processor 12 may represent one or more processing devices (e.g., microprocessors), and main storage 14 may represent the dynamic random access memory (DRAM) devices comprising the primary work space of apparatus 10, as well as any supplemental levels of memory, e.g., cache memories, non-volatile or backup memories (e.g., programmable or flash memories), read-only memories, etc. In addition, main storage 14 may be considered to include memory storage physically located elsewhere in apparatus 10, e.g., any cache memory in a processor 12, as well as any storage capacity used as a virtual memory, e.g., as stored on a storage resource coupled to the computer.

External communication with host system 11 is handled through an adapter interface 16. Adapter interface 16 provides an interface with various hardware peripheral resources, e.g., as illustrated at 22-30. Ports of the adapter interface 16 may be configured to receive input/output commands, although in other embodiments specific locations in I/O interface 16 may only be capable of receiving commands. Further, in other embodiments, adapter interface 16 may be interfaced with the processing host system 11 via separate buses or other interconnect mechanisms.

An adapter interface 16 consistent with the invention can include one or more microprocessors or micro controllers incorporating any attendant support circuitry such as memories, I/O hardware, buffers, drivers, power supply circuitry etc., typically disposed on a single circuit board. An adapter interface 16 may be capable of being used with different types of peripherals, or may be specifically tailored for use with only one type of peripheral, to include the SAN box of FIG. 2. As discussed above, the interface 16 may comprise a plurality of adapters, to include a shareable spare adapter configured to replace any of the plurality.

As such, the adapter may include additional circuitry suitable for the particular peripheral resource controlled thereby, e.g., storage control circuitry for a storage adaptor, display driving circuitry for a display adaptor, communication driver circuitry for a network adaptor, workstation control and bus communication driver circuitry for a workstation adaptor, etc.

An adapter interface 16 may communicate with practically any type of peripheral resource capable of communicating with host system 11 in a manner consistent with the invention.

It should also be appreciated that adapter interface 16 may include multiple buses, as well as extensions and interfaces to additional buses for connecting with additional peripheral resources. As discussed above, it should be appreciated that the invention should not be limited to use in the Storage Area Network environment disclosed herein. Furthermore, any combination of single- and/or multi-drop interconnections that define multiple locations at which peripheral resources may be installed may be used consistent with the invention.

In addition, any number of hardware resources may be coupled to adapter interface 16 consistent with the invention. For example, an interface to a network 22 may be provided, e.g., to provide communications capability using any number of network protocols (e.g., IPX, TCP/IP, SNA, etc.). Also, an interface may be provided directly to a storage resource 17 such as a DASD, an optical drive, a floppy drive, a hard disk drive, and/or a tape drive, as well as to a display resource 26 such as a video display, an LCD panel, etc. Also, control over one or more terminal resources 28 such as attached workstations may be provided, and an interface to an expansion bus may be provided by a bridge device 30. It should be appreciated that practically any other programmable electronic resource that is capable of interfacing and communicating with apparatus 10 may be used as a peripheral resource consistent with the invention.

Apparatus 10 generally operates under the control of an operating system, and executes various computer software applications, components, programs, objects, modules, etc. While the present invention allows for the processor of the host system 11 to coordinate substitutions of failed adapters with shareable spares, such substitution is preferably accomplished by a configuration master embedded within a peripheral resource, such as the storage device 24. Moreover, various applications, components, programs, objects, modules, etc. may also execute on one or more processors in another electronic resource coupled to the adapter interface 16, e.g., in a distributed or client-server computing environment, whereby the processing required to implement the functions of a computer program may be allocated to multiple devices over a network.

In general, the routines executed to implement the embodiments of the invention, whether implemented as part of an operating system or a specific application, component, program, object, module or sequence of instructions will be referred to herein as "computer programs", or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital, analog, and wireless communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1-5 are not intended to limit the present invention. Indeed, those skilled in the art will recognize that other alternative hardware and/or software environments may be used without departing from the scope of the invention.

Further, while the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. An apparatus, comprising:
 a plurality of access adapters, each adapter configured to interface with an electronic resource;
 at least one shareable spare adapter configured to function as a network interface that removably couples with the electronic resource; and
 control circuitry configured to assign a correlation token to each of the plurality of access adapters, each correlation token for use in connection with accessing an electronic resource via the access adapter to which such correlation token is assigned, the control circuitry further configured to initiate a substitution of the shareable spare adapter for any of the plurality of access adapters to supplant a substituted access adapter without intervention by any server in electronic communication with the electronic resource, wherein the control circuitry is configured to initiate the substitution of the shareable spare adapter for the substituted access adapter by reassigning the correlation token assigned to the substituted access adapter to the shareable spare adapter.

2. An apparatus according to claim 1, wherein the control circuitry initiates the substitution in response to an event.

3. An apparatus according to claim 2, wherein the control circuitry initiates monitoring of the event.

4. An apparatus according to claim 2, wherein the control circuitry initiates notification procedures regarding the event.

5. An apparatus according to claim 2, wherein the event includes a change in a heartbeat signal transmitted by an access adapter.

6. An apparatus according to claim 2, wherein the control circuitry initiates monitoring a process that monitors the event.

7. An apparatus according to claim 1, wherein a port of an access adapter of the plurality of access adapters interfaces with only a subset of the electronic resource.

8. An apparatus according to claim 1, wherein the control circuitry initiates a reconfiguration of an access adapter into a second shareable spare adapter.

9. An apparatus according to claim 1, wherein the control circuitry initiates a removal of a correlation token from an access adapter.

10. An apparatus according to claim 9, wherein the control circuitry initiates an assignment of the correlation token to the shareable spare adapter.

11. An apparatus according to claim 9, wherein the control circuitry initiates an evaluation of the correlation token.

12. An apparatus according to claim 1, wherein the control circuitry initiates a replacement of an access adapter.

13. An apparatus according to claim 1, wherein the control circuitry initiates a disablement of the shareable spare adapter.

14. An apparatus according to claim 1, wherein the control circuitry initiates disabling an access adapter.

15. A method of providing access to a computer resource, wherein a plurality of access adapters each interface with the computer resource, the method comprising using a shareable spare adapter consisting essentially of a circuit board configured to function as a network, nonuser interface that removably couples with the computer resource and to supplant an interface provided by a first adapter of the plurality of access adapters, wherein the shareable spare adapter is additionally configured to supplant a second interface provided by a second access adapter of the plurality of access adapters, the method further comprising assigning a correlation token to each of the plurality of access adapters, each correlation token for use in connection with accessing the computer resource via the access adapter to which such correlation token is assigned, wherein using the shareable spare adapter to supplant the interface provided by the first adapter includes reassigning the correlation token assigned to the first access adapter to the shareable spare adapter.

16. The method according to claim 15, wherein the shareable spare adapter is additionally configured to supplant a third interface provided by any of the plurality of access adapters.

17. The method according to claim 15, further comprising supplanting the interface in response to an event.

18. The method according to claim 17, further comprising monitoring of the event.

19. The method according to claim 17, further comprising initiating notification procedures regarding the event.

20. The method according to claim 17, further comprising monitoring a process that monitors the event.

21. The method according to claim 15, further comprising reconfiguring the first access adapter into a second shareable spare adapter.

22. The method according to claim 15, further comprising removing a correlation token from the second access adapter.

23. The method according to claim 22, further comprising assigning the correlation token to the shareable spare adapter.

24. The method according to claim 22, further comprising evaluating the correlation token.

25. The method according to claim 15, further comprising replacing the second access adapter.

26. The method according to claim 15, further comprising disabling the shareable spare adapter.

27. The method according to claim 15, further comprising disabling the second access adapter.

28. The method according to claim 15, wherein each of the first and second adapters access a different subset of the computer resource.

29. A program product, comprising:
a program for providing access to a computer resource, wherein a plurality of access adapters each interface with the computer resource, the program configured to use a shareable spare adapter consisting essentially of a circuit board configured to function as a network, nonuser interface that removably couples with the computer resource and to supplant an interface provided by a first adapter of the plurality of access adapters, wherein the shareable spare adapter is additionally configured to supplant a second interface provided by a second access adapter of the plurality of access adapters, the program further configured to assign a correlation token to each of the plurality of access adapters, each correlation token for use in connection with accessing the computer resource via the access adapter to which such correlation token is assigned, wherein the program is configured to use the shareable spare adapter to supplant the interface provided by the first adapter by reassigning the correlation token assigned to the first access adapter to the shareable spare adapter; and
a computer-readable signal bearing recordable media bearing the program.

* * * * *